United States Patent [19]

Carmody et al.

[11] Patent Number: 4,948,818
[45] Date of Patent: Aug. 14, 1990

[54] METHOD OF MAKING POROUS HYDROPHILIC-LIPOPHILIC COPOLYMERIC POWDERS

[75] Inventors: Walter J. Carmody; Anthony J. Buzzelli, both of Port Jervis, N.Y.

[73] Assignee: Dow Corning Corporation, Midland, Mich.

[21] Appl. No.: 351,896

[22] Filed: May 15, 1989

[51] Int. Cl.$^5$ .............................................. C08F 36/02
[52] U.S. Cl. ...................................... 521/149; 521/61; 521/63; 521/64; 521/119; 521/146; 521/147; 521/150
[58] Field of Search ........................ 521/38, 61, 63, 64, 521/53, 119, 138, 146, 147, 149, 150; 526/258, 363, 304, 313

[56] References Cited

U.S. PATENT DOCUMENTS

| Re. 27,026 | 1/1971 | Alfrey et al. | 260/2.5 |
|---|---|---|---|
| 2,809,943 | 10/1957 | Pye et al. | 260/2.1 |
| 3,418,262 | 12/1968 | Werotte et al. | 260/2.2 |
| 3,509,078 | 4/1970 | Roubinek et al. | 260/2.5 |
| 3,627,708 | 12/1971 | Morse et al. | 521/63 |
| 3,637,535 | 1/1972 | Corte et al. | 260/2.1 |
| 3,689,439 | 9/1972 | Field et al. | 521/119 |
| 3,767,600 | 10/1973 | Albright | 260/2.2 |
| 3,989,649 | 11/1976 | Kailto et al. | 260/2.1 |
| 4,174,430 | 11/1979 | Kido et al. | 521/146 |
| 4,208,309 | 6/1980 | Kraemer et al. | 260/8 |
| 4,224,415 | 9/1980 | Meitzner et al. | 521/38 |
| 4,661,327 | 4/1987 | Horton | 423/7 |
| 4,690,825 | 9/1987 | Won | 424/501 |
| 4,724,240 | 2/1988 | Abrutyn | 514/847 |
| 4,806,360 | 2/1989 | Leong | 424/487 |

FOREIGN PATENT DOCUMENTS

| 1168157 | 5/1984 | Canada . |
| 0252463 | 1/1988 | European Pat. Off. . |
| 2608533 | 9/1976 | Fed. Rep. of Germany . |
| 88/01164 | 2/1988 | PCT Int'l Appl. . |

*Primary Examiner*—Veronica P. Hoke
*Assistant Examiner*—Anang Sridharan
*Attorney, Agent, or Firm*—Jim L. DeCesare

[57] ABSTRACT

A precipitation polymerization process for producing a macroporous cross-linked copolymeric lattice, capable of adsorbing hydrophilic and lipophilic fluids, in which process there is copolymerized at least one monounsaturated monomer and at least one polyunsaturated monomer in the presence of an organic liquid which is a solvent for the monomers but not for the copolymer, initiating the copolymerization of the monomers by means of a free radical generating catalytic compound, precipitating a copolymer in the solvent in the form of a powder, and forming a dry powder by removing the solvent from the precipitated copolymeric powder. One monomer is a hydrophilic compound and the other monomer is a lipophilic compound.

14 Claims, 6 Drawing Sheets

FIG. I
1500 X
FIG. 2
10000 X
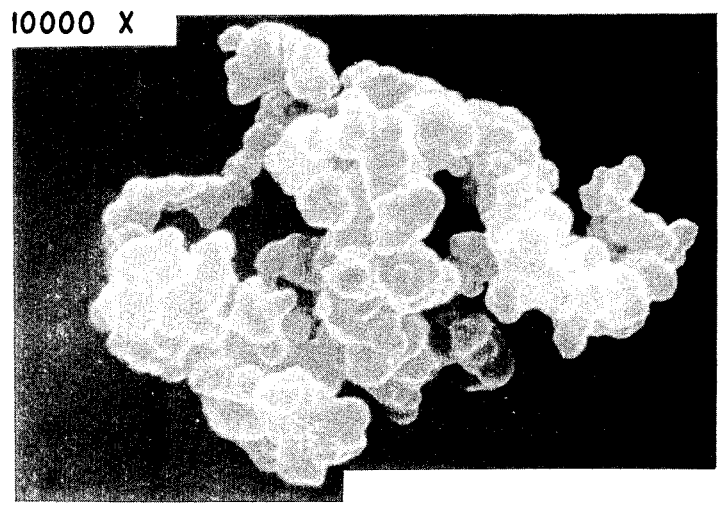

2000 X

1500 X

1000 X
0 RPM

⊢—⊣ 10 μm

1000 X
75 RPM

⊢—⊣ 10 μm

1000 X
150 RPM
⊢——⊣ 10 μm

1000 X
300 RPM
⊢——⊣ 10 μm

METHOD OF MAKING POROUS HYDROPHILIC-LIPOPHILIC COPOLYMERIC POWDERS

BACKGROUND OF THE INVENTION

This invention relates to a method for producing a macroporous cross-linked copolymeric lattice which is capable of adsorbing hydrophilic and lipophilic fluids. The copolymer is a powder which is a complex structure consisting of unit particles, agglomerates, and aggregates, which can be defined as a lattice.

The concept of producing spheres or beads by means of suspension polymerization techniques is well known in the prior art. An exemplary one of such processes is disclosed in U.S. Pat. No. 2,809,943, issued Oct. 15, 1957. However, it was found that when a material was added which is a solvent for the monomers, but acts as a precipitant for the resulting polymer, a novel form of bead was provided containing a network of microscopic channels. This discovery is set forth in U.S Patent No. 4,224,415, filed July 18, 1958, issuing some twenty-two years later on Sept. 23, 1980. In this patent, beads are produced ranging in size from about 350 to about 1200 microns. Typical monomers include divinyl toluene, diallyl maleate, and triallyl phosphate. The precipitant employed is an alkane, acid ester, or alcohol.

This technology was expanded and the precipitant was variously described in the patent literature as a diluent, porogen, active ingredient, solvent, functional material, and volatile agent. For example, in U.S. Pat. Re. No. 27,026, issued Jan. 12, 1971, porous beads of a diameter less than ten microns are disclosed. Among the monomers used to produce the beads are ethyl methacrylate, divinyl benzene and ethylene glycol dimethacrylate. In U.S. Pat. No. 3,418,262, issued Dec. 24, 1968, there is described a bead characterized as having a rigid sponge structure, and wherein the porogenic agent employed is an acid such as stearic acid. Intermediates in bead form were produced in U.S. Pat. No. 3,509,078, issued Apr. 28, 1970, using polymeric materials such as polyethylene glycols as the precipitant material during the in situ suspension polymerization process. The macroporous character of such bead construction is graphically portrayed and illustrated in FIG. 1 of U.S. Pat. No. 3,627,708, issued Dec. 14, 1971. Beads termed "pearls" are produced and containing active ingredients therein such as water or various alcohol ethers. The pearls are crosslinked to the extent of about twenty percent. In U.S. Pat. No. 3,637,535, issued Jan. 25, 1972, beads with a sponge structure are said to be capable of being compressed to an imperceptible powder. These beads are capable of being loaded with as much as 200-300% of active ingredients such as white spirit, and benzin. A rigid porous bead of a trifunctional methacrylate is taught in U.S. Pat. No. 3,767,600, issued Oct. 23, 1973. Such beads have a size of 10-900 microns, and various other monomers which can be employed include diacetone acrylamide, and ethylhexyl, hydroxyethyl, and hydroxypropyl methacrylates. Paraffin wax in an amount of 5-100% is used to form the microscopic network of channels in U.S. Pat. No. 3,989,649, issued Nov. 2, 1976. The wax may be removed from the bead structure by solvent extraction.

While many of the foregoing U.S. patents relate to ion exchange technology, a bead similar to those previously described is employed as a carrier for enzymes in U.S. Pat. No. 4,208,309, issued June 17, 1980. Such beads are of the size of about 0.1 mm. U.S. Pat. No. 4,661,327, issued Apr. 28, 1987, describes a macroreticular bead containing a magnetic core. The use of hard crosslinked porous polymeric beads in cosmetics as carriers is taught in U.S. Pat, No. 4,724,240, issued Feb. 9, 1988, wherein various emollients and moisturizers are entrapped therein. These beads are said to be capable of entrapping materials such as 2-ethylhexyl oxystearate, arachidyl propionate, petroleum jelly, mineral oil, lanolin, and various siloxanes. The size of the beads ranges from 1-3,000 microns. Typical monomers include ethylene glycol dimethacrylate, lauryl methacrylate, trimethylol propane trimethacrylate, and dipentaerythritol dimethacrylate. "In situ" hydrophobic powders and "in situ" beads may be produced in accordance with the teaching of this patent. Beads having a rigid sponge structure are also described in U.S. Pat. No. 4,690,825, issued Sept. 1, 1987, and wherein the beads function as a delivery vehicle for a host of materials including pigments, vitamins, fragrances, drugs, repellants, detergents, and sunscreens. The beads have a size of 10-100 microns and are preferably of a monomer system of styrene-divinyl benzene. Crosslinking is said to range from 10-40 percent.

The foreign patent literature includes West German Offenlegungsschrift No. P-2608533.6, published Sept. 30, 1976, and wherein porous polymeric beads produced by "in situ" suspension polymerization are provided, and which are adapted to release perfumes. A controlled release of the fragrance is disclosed, providing utility for such beads in the home, automobiles, airplanes, railway cars, hospitals, classrooms, conference centers, and gymnasiums. Canadian Patent No. 1,168,157, issued May 29, 1984, describes hard, discrete, free flowing, bead constructions in which the beads entrap a series of functional materials which can be incorporated into toilet soap, body powder, and antiperspirant sticks. The Canadian Patent, it is noted, is the equivalent of European Patent No. 61,701, issued on July 16, 1986, both of which are foreign equivalents of the parent case of the '240 patent. In European International Publication No. 0252463A2, published Jan. 13, 1988, there is disclosed a bead having a hydrophobic polymer lattice, and which entraps numerous non-cosmetic materials such as pesticides, pharmaceuticals, pheromones, and various categories of chemicals. Steroids are entrapped, for example, in the porous beads of PCT International Publication No. WO-88/01164, published on Feb. 25, 1988. The steroids are adrenocortical steroids or various anti-inflammatory type steroids. It should therefore be apparent that what began as a simple ion exchange bead concept has rapidly grown into a technology of widely varied application.

In accordance with the present invention, copolymer powders are produced by novel processes not believed to be taught in the prior art, as exemplified by the foregoing patents. Those patents, in general, relate to suspension polymerization processes for the production of porous polymeric and copolymeric spheres and beads in which the precipitant is present during polymerization. These are defined as an "in situ" process. For example, U.S. Pat. No. 4,724,240, while disclosing beads and spheres produced by "in situ" suspension polymerization techniques in one embodiment, also describes a process involving "in situ" precipitation polymerization technology, and in which there is produced powder-like materials, in contrast to beads. The PCT International Publication, while a suspension polymerization system, can also be defined as a "post adsorption" process in its use. In this variance, a volatile porogen is included which may be removed by extraction and evaporation, resulting in empty beads. The beads can be loaded with diverse active ingredients, as desired, at subsequent times. "Post adsorption" techniques are more attractive because of the flexibility in the selection of active ingredients that can be subsequently entrapped, whereas in the conventional "in situ" systems, the porogen polymerized "in situ" remains in the final product.

Thus, according to the prior art, hydrophobic cross-linked porous copolymers in particle form can be produced by at least three distinct processes. One process produces beads by "in situ" suspension polymerization, and this process is shown in Example 4 of the '240 patent, and in U.S. Pat. No. 4,690,825. Another process produces beads by suspension polymerization but the beads are "Post adsorbed" with an active ingredient after the volatile porogen is removed. This process is shown in the PCT International publication. In a third process, powders are produced by "in situ" precipitation polymerization, and this process is shown in Examples 1–3 of the '240 patent.

What has been accomplished in the present invention, however, is a unique concept differing from all of the foregoing methods, and wherein hydrophilic-lipophilic post adsorbent powders are produced. In contrast to the prior art, the powders of the present invention are capable of adsorbing lipophilic fluids, as well as hydrophilic fluids and liquids having a high surface tension such as water. The powders of the prior art have only been capable of adsorbing low surface tension liquids.

SUMMARY OF THE INVENTION

This invention relates to a precipitation polymerization process for producing a macroporous cross-linked copolymeric lattice, capable of adsorbing hydrophilic fluids and lipophilic fluids. In the process, there is copolymerized at least one monounsaturated monomer and at least one polyunsaturated monomer in the presence of an organic liquid which is a solvent for the monomers but not for the copolymer. The copolymerization of the monomers is initiated by means of a free radical generating catalytic compound, precipitating a copolymer in the solvent in the form of a powder. A dry powder is formed by removing the solvent from the precipitated copolymeric powder. One monomer is a hydrophilic compound and the other monomer is a lipophilic compound. The invention also relates to a macroporous cross-linked copolymeric powder produced in accordance with the process.

The monounsaturated monomer can be vinyl pyrrolidone, diacetone acrylamide, or 2-phenoxyethyl methacrylate. The polyunsaturated monomer can be ethylene glycol dimethacrylate or tetraethylene glycol dimethacrylate. The solvent is preferably isopropyl alcohol, although ethanol, toluene, heptane, and cyclohexane, may also be employed.

The powder which is formed by the process of the present invention is a combined system of particles which can be defined as a lattice; the system of powder particles including unit particles of less than about one micron in average diameter, agglomerates of fused unit particles of sizes in the range of about twenty to eighty microns in average diameter, and aggregates of clusters of fused agglomerates of sizes in the range of about two hundred to about twelve hundred microns in average diameter. The monounsaturated monomer and the polyunsaturated monomer can be present in mol ratios of 20:80, 30:70, 40:60, or 50:50. The process may include the step of stirring the monomers, solvent, and the free radical generating catalytic compound, during copolymerization. Preferably, the dry powder is formed by filtering excess solvent from the precipitated powder, and the filtered powder is vacuum dried. The powder may then be "post adsorbed" with various materials.

The hydrophilic-lipophilic powders of the present invention may be used as carriers or adsorbents for materials such as water, aqueous systems, emollients, moisturizers, fragrances, dyes, pigments, flavors, drugs such as ibuprofen, phosphoric acid, insect repellents, vitamins, sunscreens, detergents, cosmetics, pesticides, pheromones, herbicides, steroids, sweeteners, pharmaceuticals, and antimicrobial agents. Finely divided solids such as analgesic materials can be adsorbed by dissolving the finely divided analgesic in a solvent, mixing the analgesic and solvent with the powder, and removing the solvent. Other post adsorbable materials include alkanes, alcohols, acid esters, silicones, glycols, organic acids, waxes, and alcohol ethers.

These and other objects, features, and advantages, of the present invention will become apparent when considered in light of the following detailed description, including the accompanying drawings.

IN THE DRAWINGS

FIG. 1 is a photomicrograph of the various components of the powder produced in Example I, and including unit particles, agglomeratures, and aggregates.

FIGS. 2 and 3 are photomicrographs of the agglomerates and aggregates of FIG. 1, respectively, shown on a larger scale.

Figure 3:
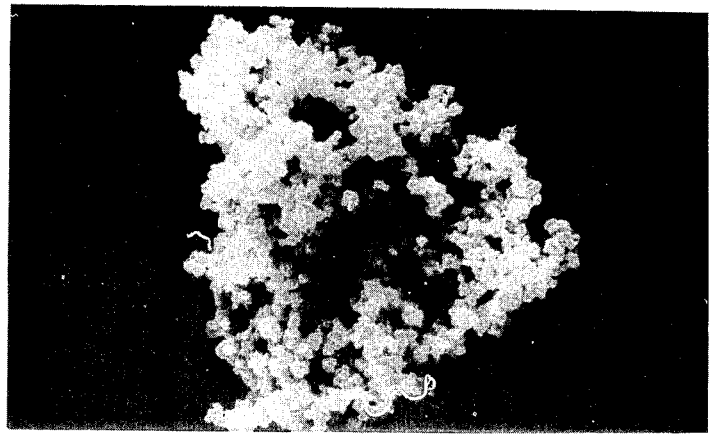

In the above figures in the drawing, the magnification is indicated in each instance. For example, the magnification in FIGS. 6–9 is 1000×, and 2000× in FIG. 10. FIGS. 6–10 also include an insert identifying a length approximating ten microns for comparative purposes.

It should be pointed out, that in viewing the various FIGS. 6–10, one will note that as the rate of stirring is increased from zero rpm up to eight hundred rpm, that the size of the unit particles increase. This is in direct opposition to what has been traditionally observed in suspension polymerization systems, wherein increases in stirring rates decrease particle size. Because of the increased size of the particulates shown in FIG. 10 and the resulting decrease in surface area, the adsorptive capacity of these large particulates is less than the adsorptive capacity of the smaller sized particulates shown in FIGS. 6-9.

The most effective particulates can be produced if the rate of stirring is maintained below about three hundred rpm, although particulates produced at rates beyond three hundred rpm are useful and adsorptive, but to a lesser extent.

DETAILED DESCRIPTION OF THE INVENTION

The material of the present invention, can be broadly and generally described as a crosslinked copolymer capable of entrapping solids, liquids, and gases. The copolymer is in particulate form and constitutes free flowing discrete solid particles even when loaded with an active material. When loaded, it may contain a predetermined quantity of the active material. The copolymer has the structural formula:

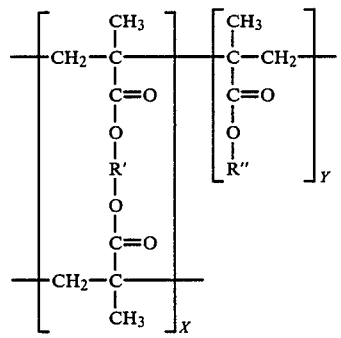

where the ratio of x to y is 80:20, R' is —$CH_2CH_2$—, and R" is —$(CH_2)_{11}CH_3$.

The copolymer is a highly crosslinked copolymer, as evidenced by the foregoing structural formula, and is particularly a highly crosslinked polymethacrylate copolymer. This material is manufactured by the Dow Corning Corporation, Midland, Michigan, U.S.A., and sold under the trademark POLYTRAP®. It is a low density, highly porous, free-flowing white particulate, and the particles are capable of adsorbing high levels of lipophilic liquids and some hydrophilic liquids, while at the same time maintaining a free-flowing particulate character.

In the powder form, the structure of the particulate is complex, and consists of unit particles less than one micron in average diameter. The unit particles are fused into agglomerates of twenty to eighty microns in average diameter. These agglomerates are loosely clustered into macro-particles termed aggregates of about 200 to about 1200 microns in average diameter.

Adsorption of actives to form post adsorbent powder, can be accomplished using a stainless steel mixing bowl and a spoon, wherein the active ingredient is added to the empty powder, and the spoon is used to gently fold the active into the powder. Low viscosity fluids may be adsorbed by addition of the fluids to a sealable vessel containing the powder and tumbling the materials until a consistency is achieved. More elaborate blending equipment such as ribbon or twin cone blenders can also be employed.

The following example illustrates the method for making a post adsorbent powder, of the type illustrated in FIGS. 1-3 and 6-10.

EXAMPLE I

A hydrophobic porous copolymer was produced by the precipitation polymerization technique by mixing in a five hundred milliliter polymerization reactor equipped with a paddle type stirrer, 13.63 grams of ethylene glycol dimethacrylate monomer, or eighty mole percent, and 4.37 grams of lauryl methacrylate monomer, or twenty mole percent. Isopropyl alcohol was added to the reactor as the solvent in the amount of 282 grams. The monomers were soluble in the solvent, but not the precipitated copolymer. Other solvents that can be employed are ethanol, toluene, cyclohexane, or heptane. The mixture including monomers, solvent, and 0.36 grams of catalytic initiator benzoyl peroxide, was purged with nitrogen. The system was heated by a water bath to about sixty degrees Centigrade until copolymerization was initiated, at which time, the temperature was increased to about 70-75 degrees Centigrade for six hours, in order to complete the copolymerization. During this time, the copolymer precipitated from the solution The copolymerization produced unit particles of a diameter less than about one micron. Some of the unit particles adhered together providing agglomerates of the order of magnitude of about twenty to eighty microns in diameter. Some of the agglomerates adhered further and were fused and welded one to another, forming aggregates of loosely held assemblies of agglomerates of the order of magnitude of about two to eight hundred microns in diameter. The mixture was filtered to remove excess solvent, and a wet powder cake was tray dried in a vacuum oven. A dry hydrophobic copolymeric powder consisting of unit particles, agglomerates, and aggregates was isolated. Powders can also be produced using other monomers of the type disclosed in U.S. Pat. No. 4,724,240.

The adsorptive capacity of the hydrophobic particulates produced in Example I, as a function of the stirring rate, was determined. The stirring rate during the reaction in Example I significantly influences the adsorption properties of the particulate materials. The adsorptivity of the particulate materials decreases with an increase in stirring rate, and the density of the particulates increases. These results are tabulated and set forth in Tables I-III.

TABLE I

| Agitation Rate (RPM) | Bulk Density Size (g/cc) | Average Aggregate Size ($\mu$) | Average Agglomerate Size ($\mu$) | Average Unit Particle ($\mu$) | Adsorption Capacity* |
|---|---|---|---|---|---|
| 0 | 0.067 | 182.5 | 33.9 | 1.0 | 83.0 |
| 75 | 0.077 | 140.6 | 36.6 | 0.5 | 84.8 |
| 150 | 0.071 | 149.8 | 39.8 | 0.8 | 83.0 |
| 300 | 0.293 | 47.0 | 34.0 | 1.5-2.0 | 58.3 |
| 800 | 0.440 | — | 10.0 | 3.0-5.0 | 37.7 |

*Percent Silicone Oil

TABLE II

| Stirring Speed RPM | Adsorption Capacity % | | | |
|---|---|---|---|---|
| | Water | Mineral Oil | Glycerine | Organic Ester* |
| 0 | 0 | 80 | 75 | 80 |
| 75 | 0 | 83.9 | 75 | 81.5 |
| 150 | 0 | 80 | 75 | 80 |

TABLE II-continued

| Stirring Speed RPM | Adsorption Capacity % | | | |
|---|---|---|---|---|
| | Water | Mineral Oil | Glycerine | Organic Ester* |
| 300 | 0 | 54.5 | 58.3 | 54.5 |

*2-ethylhexyl-oxystearate

TABLE III

| RPM | Adsorption Capacity % | | | Density (g/cm³) | |
|---|---|---|---|---|---|
| | Mineral Oil | 2-ethylhexyl oxystearate | Silicone Oil | Bulk | Tapped |
| 0 | 82.5 | 82.5 | 86.5 | 0.0368 | 0.0580 |
| 75 | 82.3 | 82.2 | 86.5 | 0.0462 | 0.0667 |
| 150 | 82.3 | 82.3 | 86.3 | 0.0527 | 0.0737 |
| 200 | 81.5 | 81.5 | 85.7 | 0.0554 | 0.0752 |
| 250 | 79.2 | 80.0 | 84.8 | 0.0636 | 0.0859 |
| 300 | 68.8 | 68.8 | 75.0 | 0.1300 | 0.1768 |
| 450 | 58.3 | 58.3 | 61.5 | 0.1736 | 0.2392 |
| 600 | 54.5 | 54.5 | 60 | 0.1933 | 0.2792 |
| 700 | 42.2 | 42.5 | 45.7 | 0.2778 | 0.4142 |
| 800 | 33.3 | 28.6 | 33.3 | 0.3862 | 0.5322 |
| 1000 | 32.8 | 28.5 | 32.9 | 0.3808 | 0.5261 |

In the foregoing tables, it can be seen that adsorption and density, as a function of stirring rate, was determined for a silicone oil, water, mineral oil, glycerine, and an organic ester. From zero rpm up to about 250 rpm, the adsorptivity of the porous copolymeric powder particulates of Example I remained essentially consistent. However, at about three hundred rpm, there was a substantial decrease in adsorptivity, which decrease became more apparent as the stirring rate was increased up to about one thousand rpm. A similar pattern is evidenced by the data which are reflective of the density.

This phenomenon is more apparent in the photomicrographic figures of the drawing. Thus, it can be seen from FIG. 6, that the particle size of the particulates increases as the stirring rate is increased, as evidenced by FIG. 10. A progression in this phenomenon can be observed in FIGS. 7-9.

While the procedure of Example I is a precipitation polymerization process and not a suspension polymerization system, the prior art dealing with suspension polymerization teaches that an increase in stirring rate causes a decrease in particle size. This is documented, for example in U.S. Pat. No. 4,224,415, issued Sept. 23, 1980, and in the PCT International Publication. The PCT International Publication employs stirring rates upwards of nine hundred to twelve hundred rpm. In Example I above, however, increases in stirring rates not only did not decrease the particle size, but in fact had exactly the opposite effect, causing the unit particle size to increase. As the rate of stirring is increased from zero rpm up to one thousand, the density of the particulate increases and the adsorptive capacity of the particulate decreases.

In accordance with the above, it should be apparent that it is possible to tailor porous particulates of a particular size and adsorptivity by means of stirring rate. Thus, with large unit particles in FIG. 10, the adsorptive capacity is less than the adsorptive capacity of smaller sized unit particles in FIGS. 6-9. While the most effective particulates are produced when the rate of stirring is maintained below about three hundred rpm. particulates produced at rates beyond three hundred rpm are useful.

Figure 4:
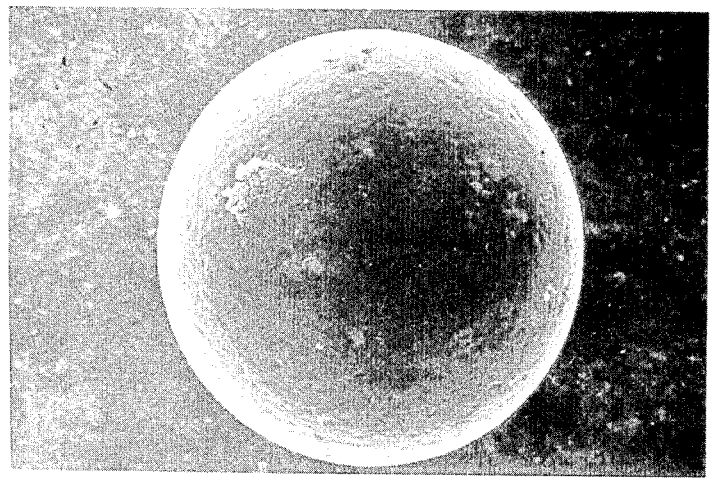
FIG. 4 is a photomicrograph of a polymer bead produced by suspension polymerization.
Figure 5:
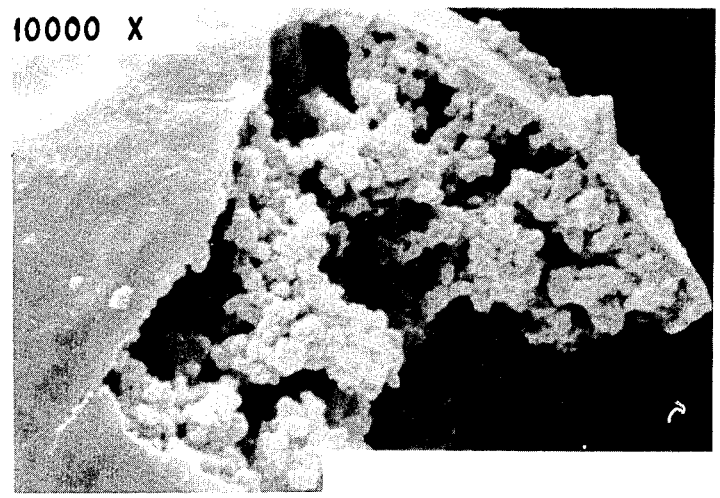
FIG. 5 is a photomicrograph of the bead of FIG. 4 with a portion of the shell removed to reveal the interior structure of the bead.
Figure 6:
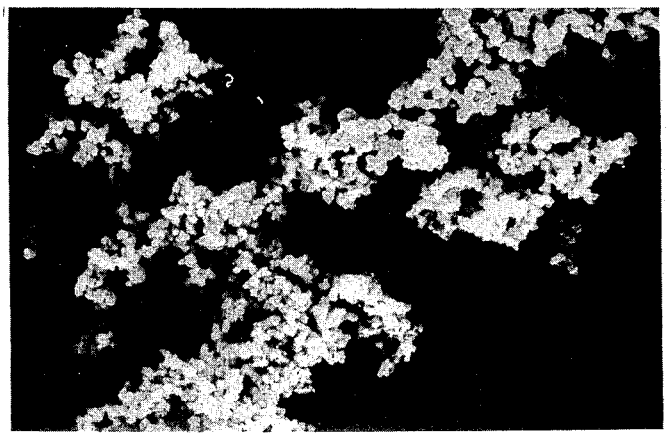
FIG. 6 is a photomicrograph of a hydrophobic copolymeric powder material. The powder is shown in magnification as it appears when the agitation rate employed in the process for producing the hydrophobic powder is zero rpm.
Figure 7:
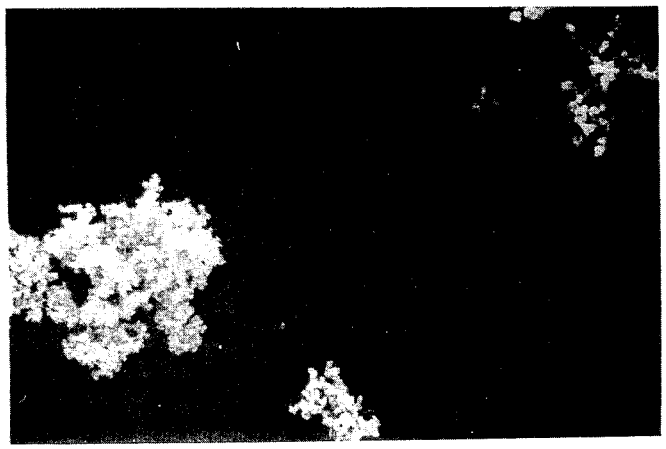
FIGS. 7–10 are additional photomicrographs of hydrophobic copolymeric powder materials. The powder is shown in magnification as it appears when the agitation rate employed in the process for producing the hydrophobic powder varies from seventy-five rpm up to eight hundred rpm.
Figure 8:
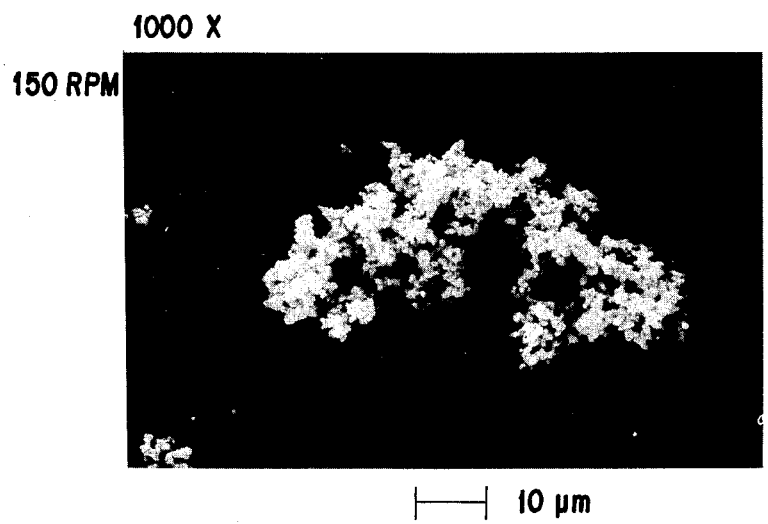
Figure 9:
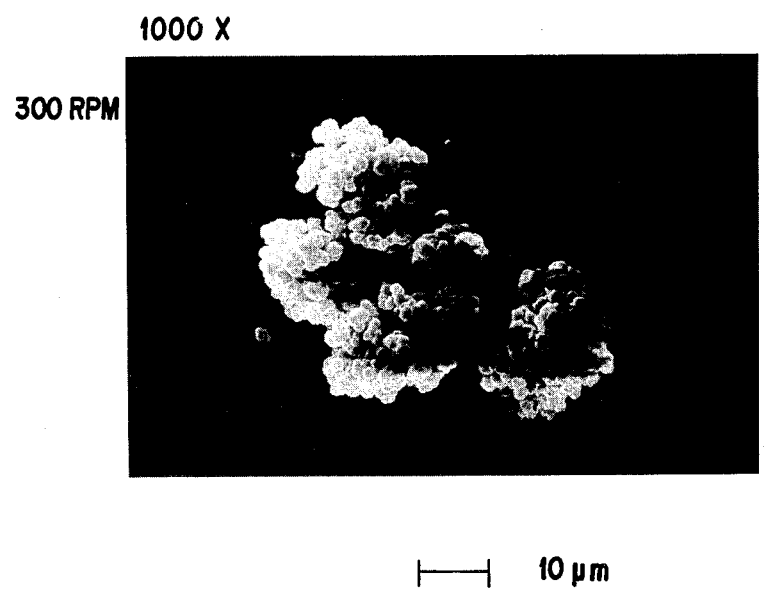
Figure 10:
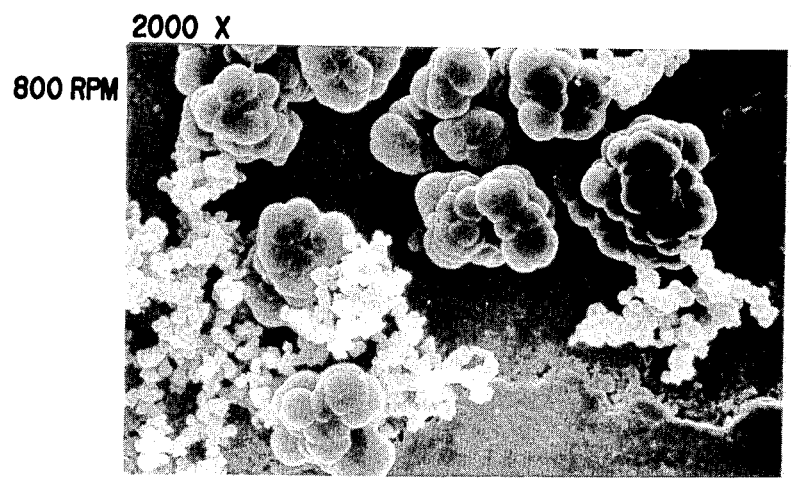

It is important to understand that the method of Example I for the production of hydrophobic porous copolymeric particulate powder materials is characterized as a precipitation polymerization technique. In accordance with this technique, monomers are dissolved in a compatible volatile solvent in which both monomers are soluble. Polymer in the form of a powder is precipitated and the polymer is insoluble in the solvent. No surfactant or dispersing aid is required. The materials produced are powders and not spheres or beads. The powder particulates include unit particles, agglomerates, and aggregates. The volatile solvent is subsequently removed resulting in a dry powder particulate, which can be post adsorbed with a variety of other types of functional active ingredients. The suspension polymerization process on the other hand, provides that polymerization be carried out in water and in some cases chloroform or chlorinated solvents. The monomers, the active, and the catalyst, form beads or droplets in water, and polymerization occurs within each bead. A surfactant or stabilizer such as polyvinyl pyrrolidone is required in order to prevent the individually formed beads and droplets from coalescing. The resulting beads, with the active material entrapped therein, include a substantially spherical outer crust or shell, the interior of which contains a macroporous structure of fused unit particles, agglomerates, and aggregates. The bead is ten microns in diameter to one hundred-fifty microns, depending upon the rate of agitation employed during the process. Such beads are shown in FIGS. 4 and 5.

Some unique features of the powders of FIGS. 1-3 and 6-10 are their ability to adsorb from sixty to eighty percent of a liquid and yet remain free flowing. The materials provide a regulated release of volatile ingredients such as cyclomethicone entrapped therein, and have the capability of functioning as carriers for other non-volatile oils. Loaded powders disappear when rubbed upon a surface. This phenomenon is believed due to the fact that large aggregates of the material scatter light rendering the appearance of a white particulate, however, upon rubbing, these large aggregates decrease in size approaching the range of visible light and hence seem to disappear. The materials find applications in such diverse areas as cosmetics and toiletries, household and industrial products, pesticides, pheromone carriers, and pharmaceuticals. The materials do not swell in common solvents and are capable of physically adsorbing active ingredients by the filling of interstitial voids by capillary action. The active ingredients are subsequently released by capillary action or wicking from the voids within the particulates.

In Examples II-IV, the hydrophobic powder material produced in Example I, was surface treated in order to render the hydrophobic powder hydrophilic. A first method is shown in Example II. A second method is set forth in Example III. Example IV describes an additional step that is included in the method of Example III. References to hydrophobic powder in Examples II-IV refers to the powder material produced in accordance with Example I.

EXAMPLE II 5.0 grams of hydrophobic powder was refluxed and stirred with 10.0 grams of NaOH, 150 cc of butyl alcohol, and 15 cc of water. After reflux for 4.5 hours, the product was filtered and washed four times with 100 cc of 1:1 isopropyl alcohol and water, once with butyl alcohol, and once again with isopropyl alcohol. The powder was vacuum dried to constant weight. Scanning electron microscopic photomicrographs of the treated powder showed no visible change in aggregate structure compared to untreated powder. Electron spectroscopic analysis showed 6 atom % Na at the surface of the powder. Attenuated total reflectance infrared radiation analysis indicated the presence of carboxylate ion (1590 cm$^{-1}$) in the treated powder.

The treated powder was easily wetted by water and produced a viscous paste upon minimal mixing. By comparison, untreated powder was completely non-wetted by water.

EXAMPLE III 2.5 grams of methacrylic acid was added to 25.0 grams of hydrophobic powder that had been suspended in a mixture of 100 cc toluene, 400 cc heptane, and 0.275 grams 1,1'-azobiscyclohexanecarbonitrile. The mixture was flushed with $N_2$ and heated at reflux (104° C.) for 4 hours. The product was filtered, washed with isopropyl alcohol, and dried under vacuum to a constant weight.

Scanning electron microscopic photomicrographs of the powder showed no apparent change in aggregate structure. Electron spectroscopic analysis showed an enrichment of oxygen (26.4 atom % O) at the surface of the powder compared to untreated powder (20.0 atom % O). The product was wettable by water.

EXAMPLE IV 5.0 grams of product from Example III was mixed with 2.0 grams NaOH dissolved in a mixture of 200 cc isopropyl alcohol and 50 cc water. The mixture was stirred for 10 minutes at 65° C. The powder was recovered by filtration, washed twice with 300 cc 1:1 isopropyl alcohol $H_2O$, and dried under vacuum to a constant weight. Electron spectroscopic analysis showed the presence of 3.4 atom % Na on the surface of the powder. The powder was highly adsorbent toward water.

Test data showing the hydrophilic nature of the materials produced by the methods of Examples II-IV are set forth in Table IV. It should be apparent from Table IV that the powder materials produced by both the method of Example II and the method of Examples III-IV are capable of adsorbing water, in contrast to the hydrophobic powder of Example I. In fact, Table II shows that the hydrophobic powders produced by Example I did not adsorb water to any extent.

In Example II, the copolymeric lattice was saponified by reacting the surface with an aqueous alkali, rendering the hydrophobic nature of the surface after saponification to be hydrophilic. Potassium hydroxide and quaternary ammonium hydroxides may also be employed. In Example III, alteration of the surface characteristics of the copolymeric lattice was achieved by polymerizing an acrylate monomer on the surface of the hydrophobic lattice in order to form hydrophilic carboxilic acid sites thereon. Other suitable monomers are acrylic acid, hydroxyethylacrylate, and acrylamide. The carboxylic acid sites may be converted to more hydrophilic carboxylate anions in Example IV by reacting the surface containing the carboxylic acid sites with aqueous alkali.

Free flowing adsorption capacity was determined by addition of incremental amounts of liquid to a known amount of powder, using gentle mixing, until the powder was no longer free flowing. The capacity was expressed as:

$$\frac{(\text{wt. Powder} + \text{Liquid}) - (\text{Initial wt. of Powder})}{(\text{wt. Powder} + \text{Liquid})} \times 100$$

TABLE IV

| Sample | Free Flow Capacity (%) | | | |
| --- | --- | --- | --- | --- |
| | $H_2O$ | Mineral Oil | Ester* | Silicone** |
| Untreated Powder Control of Example I | 0 | 77.3 | 78.3 | 78.3 |
| Powder of Example II Saponified With NaOH | 69.8 | 50.4 | 51.2 | 56.0 |
| Powder of Examle III | 74.5 | 75.6 | 72.3 | 76.9 |
| Powder of Example IV | 73.0 | 72.3 | 73.0 | 76.2 |

*2-ethylhexyl oxstearate
**Octamethylcyclotetrasiloxane

EXAMPLE V

Example I was repeated, except that different monomer systems were employed and at varying mol ratios of the monomers. The copolymeric powders produced were tested for their adsorptive capacity for various lipophilic fluids and for water. The monomer pairs employed, the mol ratios, and the adsorption data generated for each monomer pair, are shown in Table V. It will be noted that the powders produced from the monomer pairs of Example V not only were capable of adsorbing substantial quantities of lipophilic fluids, but that water was capable of being adsorbed. This is in contrast to Example I and Table II where no water was adsorbed.

Example V sets forth the concept of the present invention and provides hydrophilic-lipophilic copolymeric powders capable of adsorbing water and lipophilic fluids. By a selection of monomers, there can be produced powder materials possessing more versatility than the hydrophobic lattices of Example I. In addition, the method of Example V is a viable alternative to the surface treatment methods of Examples II-IV, and provides powder materials of substantially equivalent utility.

TABLE V

| Monomers | Mole Ratio | Absorption Percent | | | |
| --- | --- | --- | --- | --- | --- |
| | | 2-Ethylhexyl Oxystearate | Mineral Oil | Glycerine | Water |
| Vinyl pyrrolidone* Ethylene glycol dimethacrylate** | 20/80 | 77 | 74 | 80 | 70 |
| Diacetone acrylamide* Ethylene glycol dimethacrylate** | 20/80 | 68 | 75 | 73 | 75 |
| Diacetone acrylamide* Ethylene glycol | 30/70 | 68 | 66 | 73 | 72 |

TABLE V-continued

| Monomers | Mole Ratio | Absorption Percent | | | |
|---|---|---|---|---|---|
| | | 2-Ethylhexyl Oxystearate | Mineral Oil | Glycerine | Water |
| dimethacrylate** 2 Phenoxyethyl methacrylate** Tetraethylene glycol dimethacrylate* | 40/60 | 68 | 64 | 72 | 68 |
| 2 Phenoxyethyl methacrylate** Tetraethylene glycol dimethyacrylate* | 50/50 | 60 | 60 | 70 | 70 |

*Hydrophilic
**Lipophilic

The water adsorbing porous polymeric materials of Example V are to be contrasted with the water containing beads of U.S. Pat. No. 3,627,708, issued Dec. 14, 1971. The bead of the '708 patent is produced by "in situ" suspension polymerization, and is adapted to contain water only because of the presence of a solubilizer such as sodium bis(2-ethyl hexyl) sulfosuccinate. The material of the present invention, on the other hand, is produced by a precipitation polymerization process, which contains no solubilizer, and produces a material in the form of a hydrophilic-lipophilic powder consisting of unit particles, agglomerates, and aggregates. Thus, the materials of the present invention are very distinct from the materials of the '708 patent. The materials of the present invention are of general utility, and may be used for the adsorption of lipophilic fluids and hydrophilic fluids.

It will be apparent from the foregoing that many other variations and modifications may be made in the structures, compounds, compositions, and methods described herein without departing substantially from the essential features and concepts of the present invention. Accordingly, it should be clearly understood that the forms of the invention described herein are exemplary only and are not intended as limitations on the scope of the present invention.

That which is claimed is:

1. A precipitation polymerization process for producing a macroporous cross-linked copolymer powder capable of adsorbing hydrophilic and lipophilic fluids, comprising copolymerizing at least one monounsaturated monomer and at least one polyunsaturated monomer in the presence of an organic liquid which is a solvent for the monomers but not for the copolymer, initiating the copolymerization of the monomers by means of a free radical generating catalytic compound, precipitating a copolymer in the organic liquid in the form of a powder which includes unit particles, agglomerates, and aggregates, and forming a dry powder by removing the organic liquid from the precipitated copolymer powder, one monomer being a hydrophilic compound and the other monomer being a lipophilic compound.

2. The process of claim 1 wherein the monounsaturated monomer is selected from the group consisting of vinyl pyrrolidine, diacetone acrylamide, and 2-phenoxyethyl methacrylate.

3. The process of claim 2 wherein the polyunsaturated monomer is selected from the group consisting of ethylene glycol dimethacrylate and tetraethylene glycol dimethacrylate.

4. The process of claim 2 wherein the solvent is selected from the group consisting of isopropyl alcohol, ethanol, toluene, heptane, and cyclohexane.

5. The process of claim 1 in which the powder is a combined system of particles, the system of powder particles including unit particles of less than about one micron in average diameter, agglomerates of fused unit particles of sizes in the range of about twenty to eighty microns in average diameter, and aggregates of clusters of fused agglomerates of sizes in the range of about two hundred to about twelve hundred microns in average diameter.

6. The process of claim 5 wherein the powder is formed of a highly cross-linked polymethacrylate copolymer.

7. The process of claim 1 wherein the monounsaturated monomer and the polyunsaturated monomer are present in the mol ratio of 20:80.

8. The process of claim 1 wherein the monounsaturated monomer and the polyunsaturated monomer are present in the mol ratio of 30:70.

9. The process of claim 1 wherein the monounsaturated monomer and the polyunsaturated monomer are present in the mol ratio of 40:60.

10. The process of claim 1 wherein the monounsaturated monomer and the polyunsaturated monomer are present in the mol ratio of 50:50.

11. The process of claim 1 including the step of stirring the monomers, solvent, and the free radical generating catalytic compound, during copolymerization.

12. The process of claim 1 wherein the dry powder is formed by filtering excess solvent from the precipitated powder, and the filtered powder is vacuum dried.

13. A macroporous cross-linked copolymeric powder produced by the process of claim 1.

14. The powder of claim 13 in which the powder is in the form of a combined system of particles, the system of powder particles including unit particles of less than about one micron in average diameter, agglomerates of fused unit particles of sizes in the range of about twenty to eighty microns in average diameter, and aggregates of clusters of fused agglomerates of sizes in the range of about two hundred to about twelve hundred microns in average diameter.

* * * * *